United States Patent [19]
Durand

[11] Patent Number: 4,577,367
[45] Date of Patent: Mar. 25, 1986

[54] DETACHABLE HANDLE INCLUDING A SPRING-BIASED PIVOTING LOCKING MEMBER

[75] Inventor: Philippe Durand, Arques, France

[73] Assignee: Verrerie Cristallerie d'Arques J. G. Durand & Cie., Arques, France

[21] Appl. No.: 584,243

[22] Filed: Feb. 27, 1984

[30] Foreign Application Priority Data

Feb. 28, 1983 [FR] France ................... 83 03235
Sep. 28, 1983 [FR] France ................... 83 15398

[51] Int. Cl.$^4$ ................................. B25G 3/18
[52] U.S. Cl. ..................... 16/114 A; 16/DIG. 24; 403/330
[58] Field of Search ............ 16/110 R, 110 A, 111 R, 16/114 R, 114 A, DIG. 24; 403/330

[56] References Cited

U.S. PATENT DOCUMENTS

| | | | |
|---|---|---|---|
| 2,712,151 | 7/1955 | Becht | 16/114 A |
| 3,232,657 | 2/1966 | Thompson et al. | 16/114 A X |
| 3,272,547 | 9/1966 | Pryce | 16/114 A X |
| 3,306,647 | 2/1967 | Imhoff | 16/114 A X |
| 3,422,485 | 1/1969 | Pryce | 16/114 A |

FOREIGN PATENT DOCUMENTS 1431013 1/1966 France .
1554738 12/1968 France .

*Primary Examiner*—Fred Silverberg
*Attorney, Agent, or Firm*—Gottlieb, Rackman & Reisman

[57] ABSTRACT

A device for fitting and locking a handle to the body of a kitchen utensil comprises an end piece formed on the lateral wall of the body of the utensil, and a housing provided in the connecting end of the handle and into which the end piece can be inserted with a loose fit. The locking of the handle to the end piece is effected by a pivoting piece and an associated actuating structure, both mounted in the housing, for causing the pivoting piece to pivot. The upper face of the end piece has a notch, the pivoting piece has an end curved in the shape of a nose for insertion into the notch of the end piece, and the actuating structure for the pivoting piece is adapted selectively to bring the curved end of the latter into or out of the notch so as to lock or unlock the pivoting piece in this position during fitting or removal of the handle. The locking force may be applied via a toggle joint, and an unlocking push button may further be provided to form a safety clamping mechanism.

10 Claims, 21 Drawing Figures

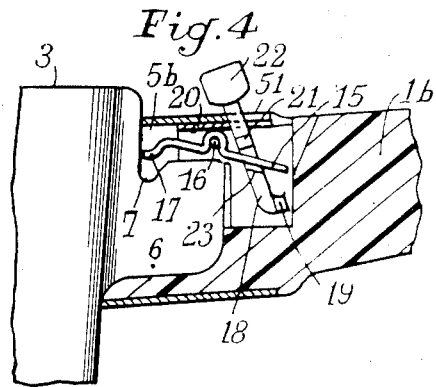
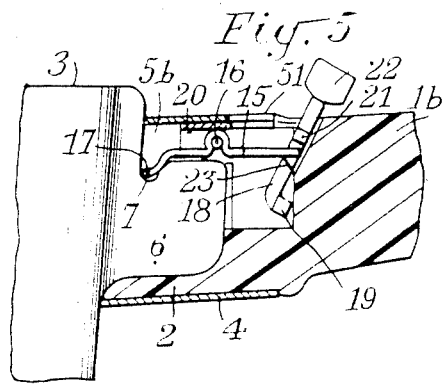
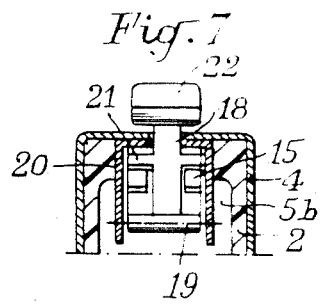
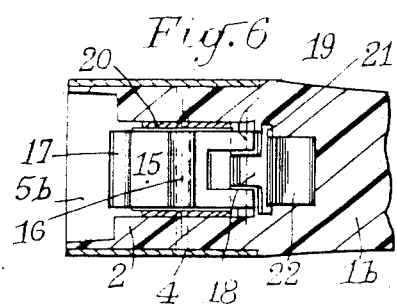
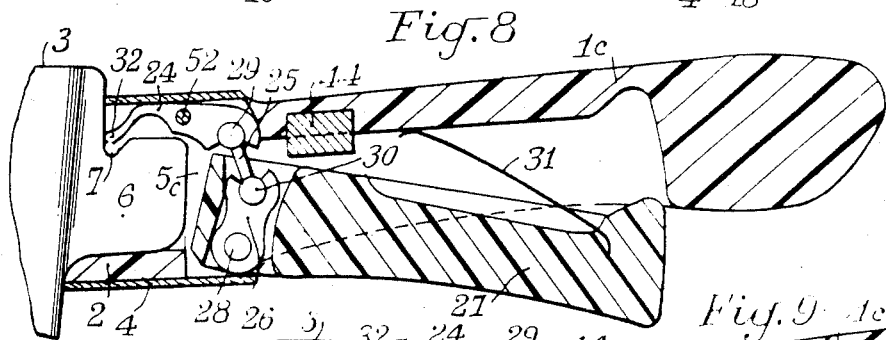
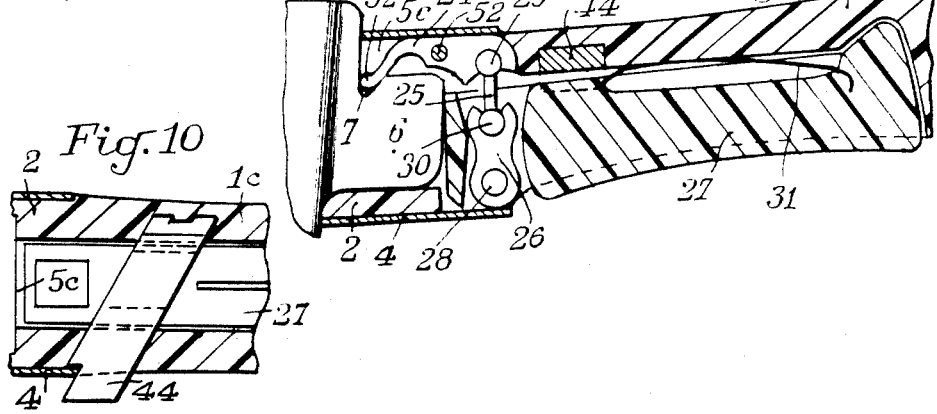
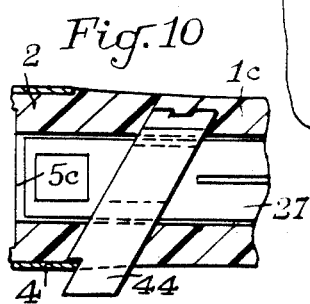

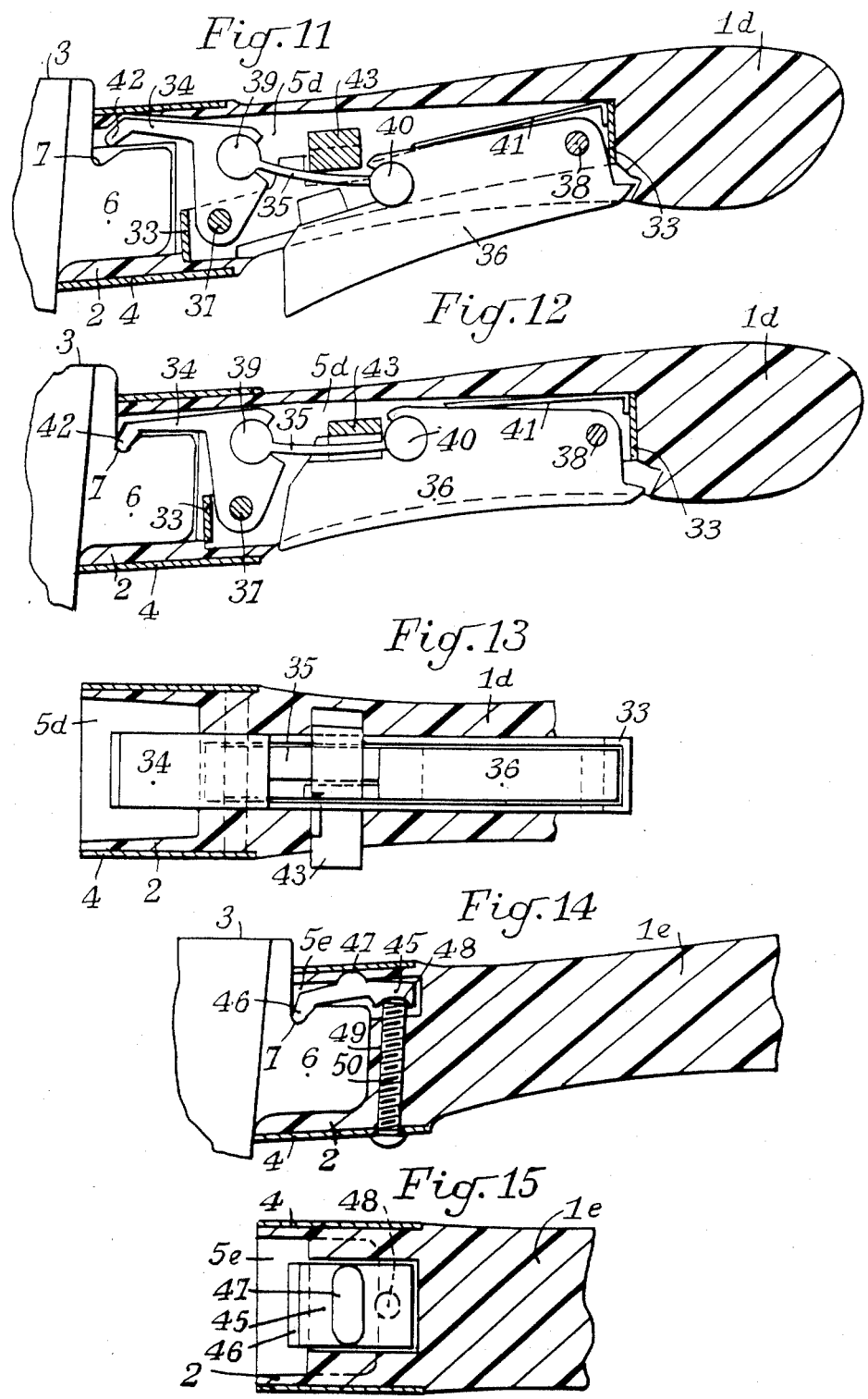

DETACHABLE HANDLE INCLUDING A SPRING-BIASED PIVOTING LOCKING MEMBER

BACKGROUND OF THE INVENTION

1. Field of the Invention

The present invention relates to a device for fitting a removable or fixed handle to the body of a kitchen utensil and, more particularly although not exclusively, a utensil whose body is made from flame proof glass or from ceramics.

2. Description of the Prior Art

A handle is generally fitted to a metal receptacle either by a connection which exerts a pull on an end-piece integral with the wall of the receptacle, or by connection between the handle and the body of the receptacle by means of an added piece, that is to say welded, bonded or riveted.

This latter method of fitting is extremely difficult to carry out on glass and ceramics with good connection safety. As for the connection exerting a pull, it cannot be used in the case of a receptacle made from glass or ceramic, because these materials do not withstand the pull very well because of the presence of internal micro cracks.

For receptacles made from porcelain or glass, couplings are known formed by a strip, generally made of metal, surrounding the body of the receptacle. The drawbacks are an average aesthetic appearance, difficult washing because of the gaps between the strip and the body, restrictions in molding the body.

Monoblock receptacles made from glass or ceramics are also commercialized. The drawbacks are the fragility of the handle to shocks, difficulty of manufacture, less certain heat insulation of the handle and the fact that in general these receptacles are less aesthetic and less functional, since the handle is situated right at the top of the body of the receptacle.

Other systems, used in particular for dishes and pans, use handles of the clamping type which clamp onto lugs provided on the body of the receptacle. However the connection is very average, the aesthetic appearance is doubtful and a casserole or pan is not really obtained.

A first improvement was made by the French Pat. Nos. 1.431.013 of Jan. 26, 1965 and 1.554.738 of Oct. 26, 1967, which provide glass projections formed at the same time as the body is manufactured and having a cavity in which the male part of the handle is embedded; a sliding blade provides locking.

This improvement, through the shape of the projection, presents difficulties of manufacture due mainly to retraction of the glass during cooling of the object.

Moreover, with this embodiment the projection has to be positioned at the upper level of the pan (as in the case of monoblock pans), which adversely affects the aesthetic appearance and the functional side of the object (poor balance).

SUMMARY OF THE INVENTION

The present invention aims at palliating all these disadvantages. For this, it provides a device for fitting a removable or fixed handle to the body of a kitchen utensil, comprising an end piece formed on the lateral wall of the body of the utensil, a housing provided in the connecting end of the handle and in which said end piece is adapted to be inserted with an easy fit and a locking device mounted in said housing and comprising a pivoting piece and means adapted for causing this piece to pivot, wherein the upper face of the end piece has a notch, the pivoting piece has an end curved in the shape of a nose for insertion in the notch of the end piece and the means adapted to cause said piece to pivot are arranged so as to bring its curved end into the notch and to lock the piece in this position or to unlock it, during fitting or removal of the handle, said end piece, in the locked position, being subjected to a compression between said pivoting piece and the lower face of the housing provided in the connecting end of the handle.

The end piece is thus subjected to a compression force in its thickness, which is particularly favorable when it is made from glass or ceramics, these materials resisting extremely high compressions well but resisting badly pulling forces.

Said notch of the end piece and said pivoting piece have, respectively, sufficient length and width for the endpiece-handle connection to be strong.

When the body of the utensil is made from glass or from ceramics, the end piece made from the same material is advantageously integrally molded with the body. It may be placed at a different level from the upper edge of the body, which improves the aesthetic appearance and facilitates handling of the utensil. It has advantageously a compact and stocky shape (its three dimensions are then substantially identical) facilitating cleaning, maintaining (in the absence of the handle) a good appearance and having a better resistance to shocks as well as to the stresses developed by the handle-body connection of the utensil. Furthermore, since the locking notch is on the upper face of the end piece, it is free from any contact, immediately after the pressing force exerted during manufacture of the body of the utensil and of its end piece by molding; this provides for shrinkage of the molded assembly without stresses and so greatly facilitates manufacture.

Preferably, the end piece and its housing in the handle have a general parallelepipedic shape, the fitting being thus unable to rotate about the axis of the handle, which provides perfect safety when handling the filled utensil for moving it, or pouring its contents for example. Also preferably, so as to ensure a stronger connection between the body of the utensil and the handle, said notch is formed on the upper face of the end piece, along the connecting line of this latter with the lateral wall of the body of the utensil.

The handle may be made from any material usually used, sufficiently strong and advantageously heat insulating; Bakelite may be mentioned, among others.

In one particular embodiment of the present fitting device, the pivoting piece is a link in the form of a catch or pawl situated at one end of a link assembly called toggle joint, the locking means are formed by other links of said assembly, one of these links in the form of a trigger playing the role of locking lever operating against the action of a return spring, and an unlocking push button is provided which, when it is pressed, exerts a downward pressure on the locking lever, which breaks up the bracing effect of the links of the toggle joint.

According to an improvement, this particular fitting device further comprises a safety clamping mechanism for the handle in the locked position, consisting of an unlocking push button having a particular structure comprising a generally parallelepipedic shaped bolt which has, in its front region, a projecting cylindrical upper face and a truncated cone shaped lower face and which has on one side a slightly concave lateral face whose curvature has as center the hinging axis of the trigger to the handle, and further consisting of a housing of corresponding shape for this push button in the trigger, this housing comprising a transverse truncated cone shaped recess which has a set-back and is extended by a cylindrical recess itself connected by a ramp to the upper part of the trigger, said bolt actuatable by the head of the push button being able to rotate, after locking of the handle, in the truncated cone shaped recess through its truncated cone shaped lower face, until it is engaged in and comes into abutment by its upper cylindrical projecting face against said set-back of the truncated cone shaped recess, so as to provide safety clamping of the handle in the locked position. The handle then behaves like a fixed handle; the push button cannot be pressed in along its axis into the trigger, which therefore cannot be unlocked; the whole of the device is immobilized.

The purpose of this improvement is to give a feeling of safety to the users and also to extend the useful life of the removable handle, which may be common to several receptacles, such as cooking pans; in fact, when the clamping pressure becomes insufficient through wear of the toggle joint, this latter does not remain in the locked position, but unlocking thereof may be prevented by using the safety clamping mechanism.

For unlocking, it is sufficient to rotate the push button in the reverse direction until it can be again pressed into the trigger.

BRIEF DESCRIPTION OF THE DRAWINGS

Different embodiments of the locking device are possible. Six variants are described hereafter by way of examples which are purely indicative and in no wise limiting, with reference to the accompanying drawings in which:

FIGS. 1 to 3 are views, respectively in partial longitudinal vertical section before locking, in partial longitudinal vertical section after locking, and in partial horizontal section of the handle alone, according to a first embodiment of the present device for fitting a removable handle to the body of a kitchen utensil, such as a pan, frying pan or similar.

FIGS. 4 to 6 are views similar to FIGS. 1 to 3 of a second embodiment, and FIG. 7 is a cross sectional vertical view of the handle alone;

FIGS. 8 to 10 are views similar to FIGS. 1 to 3 of a third embodiment;

FIGS. 11 to 13 are views similar to FIGS. 1 to 3 of a fourth embodiment;

FIG. 14 is a partial longitudinal vertical sectional view after locking of one embodiment in which a handle is fixedly fitted to the body of a kitchen utensil, FIG. 15 is a partial horizontal section of the handle alone;

DESCRIPTION OF THE PREFERRED EMBODIMENTS

Figure 1:
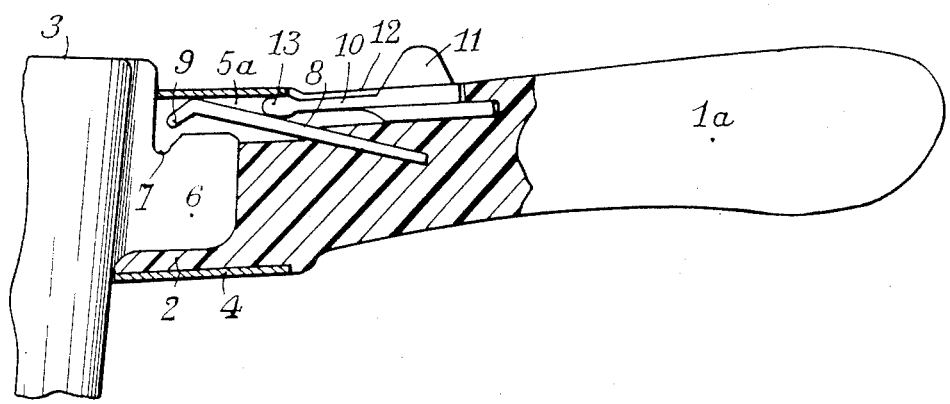
Figure 2:
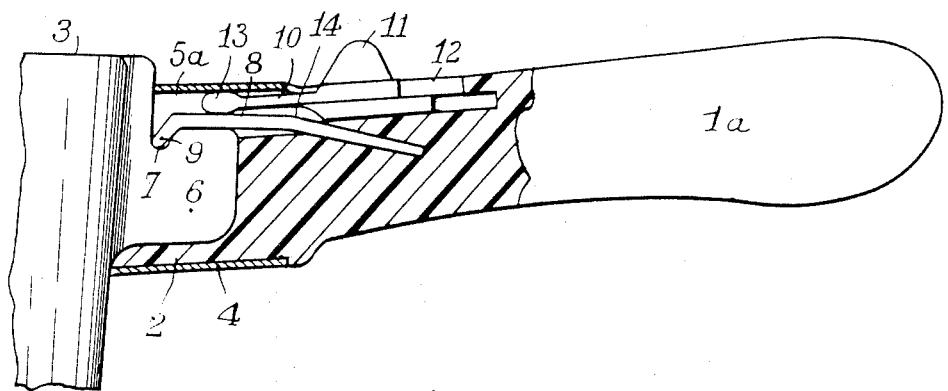
Figure 3:
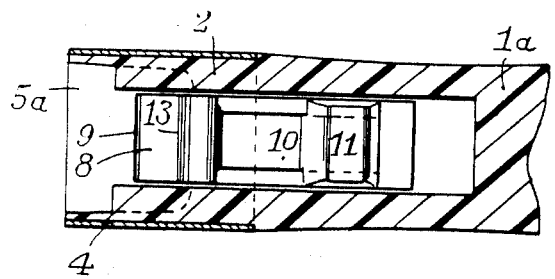

The device shown in FIGS. 1 to 3 comprises a handle 1a, made for example from Bakelite, whose connecting end 2 with the body 3 of a kitchen utensil, which is made for example from fire proof glass, is surrounded by a socket 4, made for example from metal, and has a housing 5a for receiving an end piece 6 integral with the side wall of the body 3 of the utensil. This end piece may be integrally molded when the body of the utensil is made from glass or ceramics. It has a general parallelepipedic compact shape. It is situated below the upper level of body 3 and it has, on its upper face, a notch 7 which is formed preferably, as shown, along the connecting line of the end piece with the lateral wall of the body of the utensil.

The device for locking and clamping the handle 1a on the body of the utensil through the end piece 6 thereof is situated in the housing 5a provided at the end of the handle. It comprises a blade spring 8 disposed in the top part of the housing, whose rear end is fixed in the handle and whose front end 9 is curved downwardly. Above the blade spring 8 a plate 10 is slideably mounted in the handle and is actuated by a button 11 associated with the plate and which projects above a sliding aperture 12 provided on the top of the handle. To fix the handle to the body of the utensil, with button 11 in the rear position, the connecting end 2 of the handle is engaged on the end piece 6, the dimensions of the parts being such that this engagement takes place fully with an easy fit (FIG. 1). Holding the handle firmly in the hand, button 11 is pushed forwardly, the blade spring 8 bends under the pressure of blade 10 which acts as a wedge; button 11 is pushed further until the nose shaped end 9 of the blade spring has penetrated to the bottom of notch 7 of the end piece. The front end 13 of plate 10 is enlarged so as to exert a suitable pressure on the blade spring 8. When this enlarged part has gone beyond the inflection point 14 of the blade spring, locking is stable, clamping is ensured (FIG. 2). Unlocking is easily obtained by moving button 11 rearwardly. This handle 1a is therefore removable.

In the other embodiments shown in the drawings, identical elements bear the same reference number and similar elements bear the same reference number accompanied by a letter, which varies from one embodiment to the other.

FIGS. 4 to 7 illustrate another method of fitting a removable handle 1b. The locking device is mounted in the housing 5b and it comprises a lever 15 mounted in its middle region for pivoting about a pin 16 and whose front end 17 is bent downwardly. This lever 15 is mounted in the top region of housing 5b and its rear region is shaped as a two pronged fork. An operating lever 18 is engaged between the two prongs of the fork, is pivotably mounted at its lower end about a pin 19 and has on each of its sides an inclined guide path 23, on which the two prongs of the rear fork of lever 15 rest. Pivot pins 16 and 19 are fixed and the whole of the locking device is mounted on support 20 placed inside housing 5b. A cross shaped piece 21 of the operating lever 18 helps to maintain the prongs of said fork on the guide paths of this operating lever, whose upper end is provided with an actuating button 22 situated above an aperture 51 formed in the handle for movement thereof. With this button, the operating lever 18 may be moved between a rear position and a front position.

For fitting the handle 1b, button 22 is brought to the front position (FIG. 4), the connecting end 2 of the handle is engaged with an easy fit and fully on the end piece 6 of the body of the utensil and, holding the handle in the hand, button 22 is pushed rearwardly with the thumb, which causes the operating lever 18 to pivot rearwardly which, during this movement, raises the rear of lever 15 by means of its lateral and oblique guide paths 23 (FIG. 5). Lever 15 having thus pivoted, its nose shaped curved front end 17 has penetrated into the notch 7 in end piece 6. The handle is thus locked to the end piece and clamping in the locked position is provided by the position of the pivot pin 19 of the operating lever 18 and by the fact that the two rear prongs of lever 15 come to bear at the top of the two guide paths 23 of the operating lever 18. Unlocking is obtained by moving button 22 in the opposite direction (FIG. 4).

FIGS. 8 to 10 illustrate the device for fitting a removable handle 1c to the end piece 6 of the body 3 of a kitchen utensil. The pivoting piece is a link in the shape of a pawl 24 forming part of a link assembly called toggle joint, which is mounted in the housing 5c provided in the handle. This assembly comprises two other links 25 and 26, this latter being integral with an operating lever in the form of a trigger 27. Link 24 is mounted for pivoting about a fixed pin 52, link 26 is mounted for pivoting about a fixed pin 28. The intermediate link 25 connects links 24 and 26 together by being pivotably mounted in the facing ends of these two links, in dependence on two mobile pins 29 and 30. The operating lever 27 is actuatable against the action of a spring 31 which may be a wire or leaf spring, one end of which is fixed in lever 27 and the other end of which bears against and may move against a face of housing 5c.

In the unlocked position (FIG. 8), spring 31 holds the operating lever 27 in the lowered position. The links are then in a position such that the front nose shaped end 32 of link 24 is in a top position. The connecting end 2 of handle 2c may then be engaged with a loose fit and fully on end piece 6. By then tightening the fingers about the handle, the operating lever 27 can be caused to rise against the action of spring 31; the lever, which pivots about the fixed pin 28, transmits its movement to link 26 which causes link 25 to move and link 24 to pivot about the fixed pin 52 with, consequently, lowering of the nose 32 of this link 24 until it comes into abutment against the bottom of notch 7 of end piece 6 (FIG. 9). Clamping in the locking position follows from a bracing effect of the toggle joint, which is obtained when the fixed pivot pin 28 and the mobile pins 29 and 30 are aligned.

For unlocking, a lateral push button 44 is provided on the handle, which must be pressed in while ceasing to exert a pressure with the fingers on the operating lever 27 and the movement of which along an inclined ramp, in a way known per se, results in breaking the bracing effect of the links of the double joint, while forcing the operating lever 27 to move down, with the complementary effect of the return spring 31 (FIG. 8). The push button is connected to a return spring, not shown, which returns it to its rest position when it is released.

The toggle joint may therefore provide gripping and simultaneously automatic clamping. This link effect, used in numerous mechanical assemblies, has never before seen applied to the connection of a handle to a receptacle body. It offers in this case the following advantages: removable handle, large gripping force because of the gearing down effect due to the toggle joint, high fixing safety by self clamping of the system (so stability in the closed position), ease of use (the stable off load position being the only open position, i.e. the position of immediate use, and locking and unlocking being effected without effort with a single hand), and gripping and clamping ensured automatically by the single fact of taking hold of the handle, without any possibility of accidental unlocking operation. This embodiment seems then particularly favorable. It is furthermore aesthetic in appearance since, in the closed position, nothing except the lateral push button, distinguishes the present removable handle from a normal pan handle.

The embodiment shown in FIGS. 11 to 13 is based on the same principle of the toggle joint. In housing 5d of handle 1d is inserted a support 33 on which is mounted the toggle joint, which comprises links 34, 35 and 36, this latter being simultaneously an operating lever. Link 34 is pivotably mounted about a fixed pin 37 and the operating lever 36 is pivotably mounted about a fixed pin 38, whereas link 35, which connects the other two links together, is mounted in facing housings thereof for pivoting about mobile pins 39 and 40. The rear link or operating lever 36 pivots against the action of a return spring 41.

As in the previously described embodiment, handle 1d is fitted to end piece 6 of the utensil body 3 when the operating lever 36 is in the lowered position. Then the connecting end 2 of the handle is engaged fully and with a loose fit on end piece 6 (FIG. 11). Link 34 is in the raised position. Locking and clamping take place as before, by bringing the operating lever 36 back with finger pressure to a top position inside the handle (FIG. 12). This movement caused the front nose 42 of link 34 to lower, and come into abutment against the bottom of notch 7 of end piece 6. The bracing effect of the toggle joint is obtained when the fixed pin 38 and the mobiles pins 39 and 40 are aligned.

Unlocking is obtained, as in the preceding embodiment, by pressing a lateral push button 43 while simultaneously releasing pressure on the operating lever 36. The push button breaks the bracing effect of the links of the toggle joint while forcing the operating lever to a lower position, with the combined action of the return spring 41. The links are then brought back to their unlocking position (FIG. 11). The push button is connected to the return spring, not shown, which returns it to its rest position when released.

FIGS. 14 and 15 show a device for mounting a fixed handle 1a on the end piece 6 of the body 3 of the utensil. The pivoting piece in this case is a lever 45 having a curved nose shaped end 46 and a boss 47 in the middle region of its upper face and a housing 48 for a pointed screw tip on the inner face of its rear region.

With socket 4 fitted over the connecting end 2 of handle 1e, the handle is turned over so as to bring its upper face into a bottom position and lever 45 is positioned in the housing 5e of the connecting end of the handle so that its pivoting boss 47 penetrates into a corresponding cavity in the wall of the connecting end 2 which is, in its normal position, the wall forming the upper face of housing 5e. Then the turned over handle 1e is engaged with a loose fit and fully onto the end piece 6 of the body of the utensil also turned over, and a screw 50 is fitted into a tapped hole 49 formed in the connecting end 2 of the handle from the lower face thereof as far as housing 48, which screw is screwed in so that its tip pressing against the bottom of housing 48 causes lever 45 to pivot about its boss 47, so as to bring the nose 46 of the lever to the bottom of notch 7 of the end piece 6 and to lock it there. The handle 1e is thus secured and the utensil may then be turned over again.

Handle 1f (FIGS. 16 to 21) of a receptacle such as a cooking pan is a hollow shaped piece housing the device for locking the handle on an end piece 6 of the receptacle. Handle 1f is comparable to the handle 1c of FIGS. 8 to 10, in so far as the locking device is concerned, which comprises an assembly of links called toggle joint.

Locking takes place by engagement of the curved end 32 of a link in the form of a pawl 24 in a notch 7 of end piece 6. This pawl pivots about a fixed pin 52 passing through the part of handle 1f connected to the receptacle. The other end 53 of pawl 24 is mounted on the mobile pin 29 of two links 25 placed on each side of the pawl 24. These links 25 are connected by a second mobile pin 30 to one of the curved ends of two double S shaped springs 54 which are housed with a certain play in two grooves 66 provided at the front of each side of a trigger 27 housed in a recess 55 in the handle. These springs 54 are thus interlocked with the trigger which may pivot about a fixed pin 28 (on which the second end of springs 54 is also mounted), against a spring 31. Pin 28 passes through the handle and the trigger. The assembly formed by pawl 24, links 25 and trigger 27 carrying springs 54 forms a toggle joint.

The mobile pin 30 passes through trigger 27, at the top of the front region thereof, through an aperture not shown which provides for this pin a fairly large vertical play (for example from 2 to 3 mm). The movements of pin 30 are transmitted as a whole to the mobile pin 29 by the rigid links 25 and, by pawl 24 rotating about pin 52, they are also transmitted to the nose piece 32 of this pawl with an amplitude multiplied as a function of the ratio of the two parts of the pawl on each side of the fixed pin 52.

Springs 54, one end of which is connected to pin 30, have a curvature calculated so that this pin is permanently pushed back towards the top of said aperture allowing play of pin 30; thus correct locking is obtained, when the toggle joint is closed, even with differences of the order of a few millimeters of the thickness of end piece 6 at the bottom of notch 7. This possibility of variation of the thickness of the end piece facilitates manufacture of the receptacle.

The trigger 27 has at the rear of its pivot pin 28 on handle 1f a transverse truncated cone shaped recess 56 extended by a cylindrical recess 57 itself connected by a ramp 58 to the top region of the trigger. The truncated cone shaped part 56 has at the end of travel a set-back 59.

This recess 56, 57 serves as a housing for a particular push button formed by a bolt 60 having a generally parallelepipedic shape integral with an operating piece 61 which may be a button, or a similar manipulatable member passing through the side of the handle. This bolt has, in its front region, a projecting cylindrical upper face 60a and a truncated cone shaped lower face 62 which bears against the truncated cone shaped recess 56 of trigger 27 (FIGS. 17 and 19 to 21). It is also curved on its lateral face 60b along a radius whose point of rotation is the pin 28 pivoting the trigger on the handle. A return spring 64 is associated with the push button.

Figure 16:
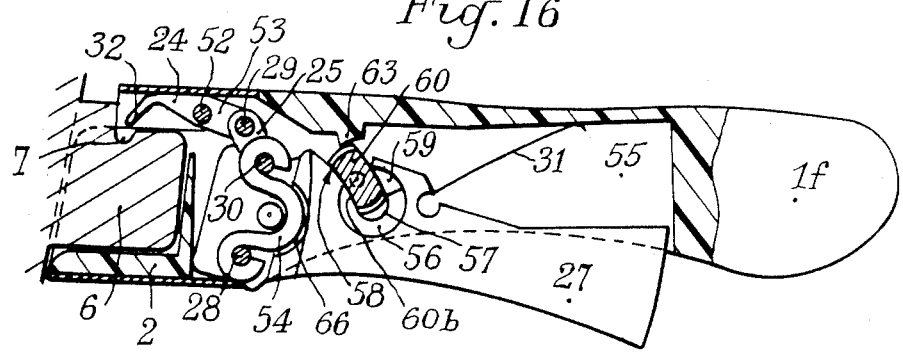
FIG. 16 is a partial longitudinal vertical section of a sixth variant, before locking of the handle which is removable.

In the free position of the handle, bolt 60 is not engaged in housing 56, 57 and the pawl 24 is floating (FIG. 16).

Figure 17:
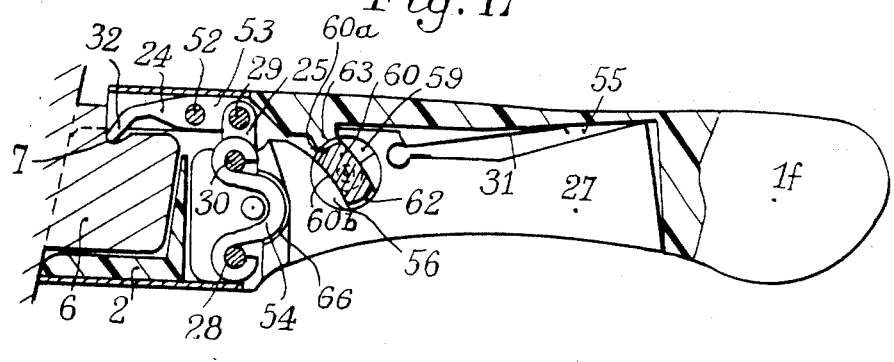
FIG. 17 is a similar view after locking.
Figure 18:
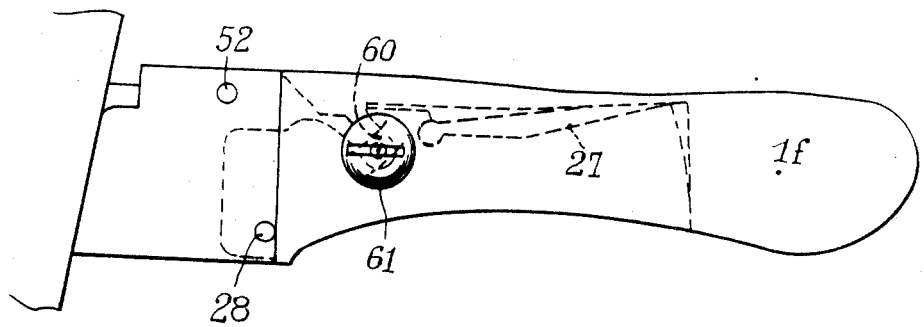
FIG. 18 is a side elevational view of this variant showing the push button in the safety clamping position.
Figure 19:
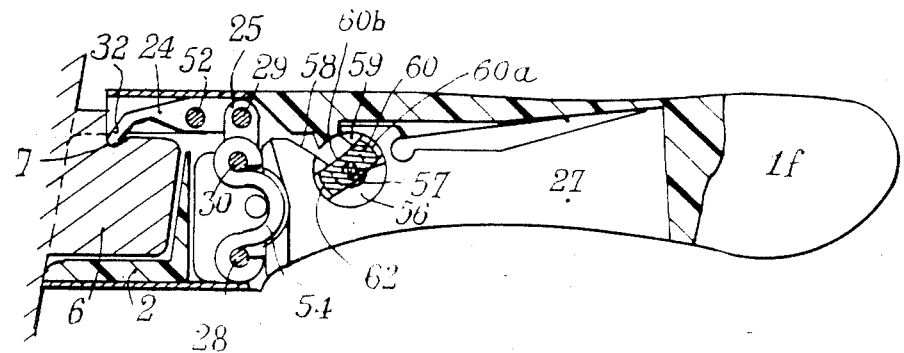
FIG. 19 is a partial longitudinal vertical sectional view corresponding to FIG. 18.
Figure 20:
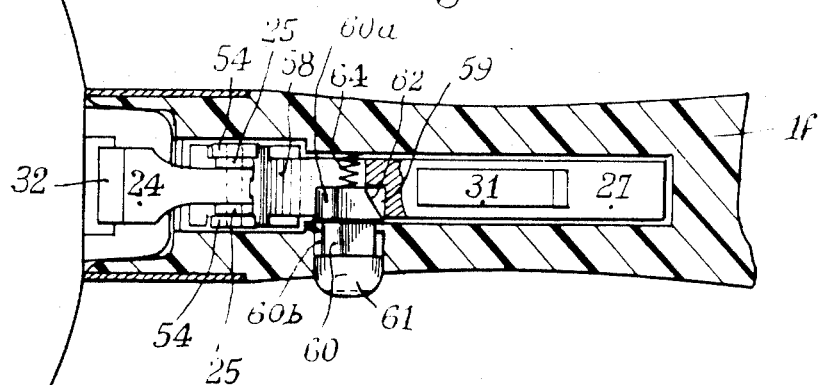
FIG. 20 is a top view, partially in section, showing the push button in the rest position, the handle being locked, but without safety clamping.
Figure 21:
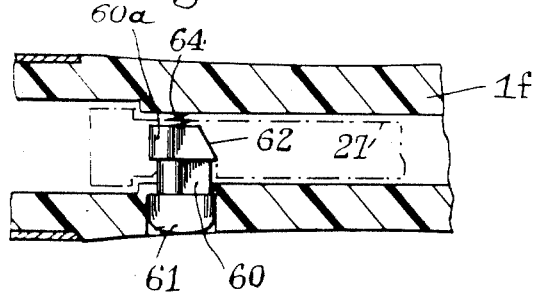
FIG. 21 is a partial sectional view corresponding to FIG. 20 showing the push button in the unlocking position.

For locking the pawl 24 and so the handle, trigger 27 is rotated in the housing 55 of handle 1f; bolt 60 then engages completely in recesses 56 and 57 until it comes into abutment against a boss 63 of the handle (FIG. 17). Pressing trigger 27 into housing 55 causes the end 32 of pawl 24 to pivot in the notch 27 of end piece 6 through the links 25, which locks the handle against the receptacle (FIGS. 17 and 20).

By rotating button 61 a quarter of a turn to the right (FIGS. 18 and 19), during which movement its lower truncated cone shaped face 62 rotates in the truncated cone shaped recess 56, bolt 60 falls and abuts by its projecting cylindrical face 60a in the set-back 59 of the truncated cone shaped recess, which clamps the trigger in the locked position of the handle. Thus the push button with a special structure and the cooperating recesses of its housing in the trigger form a mechanism for safety clamping of the handle.

If button 61 has not been rotated by a quarter of a turn and if this button is pressed against the action of spring 64 (FIG. 21), the truncated cone shaped part 62 of bolt 60 is caused to slide over the truncated cone shaped part 56 of the recess of the trigger which, by exerting a downward pressure on the trigger, frees this latter in the position of FIG. 16; the handle is unlocked. Because of the return spring 64, the push button comes back to its original position.

This device has the advantage of absolute safety, clipping of the handle on the end piece of the receptacle being locked both by the effect of the toggle joint and by abutment of the bolt against a boss of the handle and clamped by rotation of the safety button which causes the bolt to fall into a cavity of the recess of the trigger.

To go from the clamped trigger position to the unclamped trigger position, button 61 must be rotated by a quarter of a turn towards the left. Unlocking of the toggle joint is then obtained by a simple thrust on the safety button.

Modifications of detail within the scope of technical equivalents may be made to the device as described above and similar embodiments having the characteristics set forth in claim 1 hereafter may be imagined, without for all that departing from the scope and spirit of the invention.

What is claimed is:

1. A device for fitting a removable handle to the body of a kitchen utensil having an upper edge, comprising an end piece formed on the lateral wall of the body of the utensil and having an upper face, a housing provided in the connecting end of the handle and in which said end piece can be inserted with a loose fit, and a locking device mounted in said housing and comprising a pivoting piece and means for causing said pivoting piece to pivot, the upper face of the end piece having a notch, said pivoting piece having an end curved in the shape of a nose for insertion in the notch of the end piece, and said means for causing said pivoting piece to pivot being arranged so as to selectively bring said curved end into or out of the notch and so as to lock the pivoting piece in this position or to unlock it, during fitting or removal of the handle, said end piece, in the locking position, being subjected to a compression force between said pivoting piece and the lower face of the housing provided in the connecting end of the handle, wherein said pivoting piece is a first link in the form of a pawl situated at one end of an assembly of links constituting a toggle joint, said locking means are formed by the other links of said assembly, one of these links being incorporated in a trigger serving as a locking lever and biased outwardly of the handle under the action of a return spring, so that when said trigger is pushed inwardly of the handle it brings said other links of the toggle joint into a bracing relation to said first link, and an unlocking push button is provided which, when it is pushed, exerts a pressure on the locking lever outwardly of the handle, which breaks the bracing effect of said other links of the toggle joint.

2. The device as claimed in claim 1, and further including a safety mechanism for clamping the handle to the end piece in the locked position, said safety mechanism comprising said unlocking push button with an associated return spring, the push button having a special structure including a generally parallelepipedic shaped bolt which has, in its front region, an upper cylindrical projecting face and a lower truncated cone shaped face and which has on one side a slightly concave lateral face whose curve has as its center a pin about which said trigger pivots jointly with said one link on the handle, and a housing of corresponding shape for said push button in the trigger, said push-button housing including a transverse truncated cone shaped recess which has a set-back and is extended by a cylindrical recess itself connected by a ramp to the upper part of the trigger, said bolt, actuatable by the head of the push button, being able to rotate, after locking of the handle, in said truncated cone shaped recess by its truncated cone shaped lower face, until it engages in and abuts by its cylindrical projecting upper face against said set-back of said truncated recess for providing safety clamping of the handle in the locked position.

3. The device as claimed in claim 1, wherein said end piece is located at a level lower than that of the upper edge of the body.

4. The device as claimed in claim 2, wherein said trigger is housed in a recess in said handle, and said assembly of links constituting said toggle joint comprises, as said other links, two intermediate links mounted on a first mobile pin for jointly pivoting on the rear of the first link on each side thereof, and two end links in the form of double S springs connected by one of their curved ends to the rear ends of said two intermediate links by means of a second mobile pin, these two springs being housed with play in two grooves formed at the front of each side of the trigger and being interlocked with the trigger which is mounted for pivoting against the action of said return spring about a fixed pin, which passes through the handle and the trigger and on which are also mounted the second ends of said springs, and said second mobile pin passing through the trigger, at the top of the front region thereof, through an aperture providing for this pin a vertical play of a few millimeters.

5. The device as claimed in claim 4, wherein said end piece and its said housing in the handle have a generally parallelepipedic form, thereby fitting together without the possibility of relative rotation therebetween about the axis of the handle, said end piece has a compact form and is located at a level lower than that of the upper edge of the body, and said notch is formed on the upper face of said end piece and runs generally alongside the portion of the lateral wall of the body of the utensil to which the end piece is joined.

6. The device as claimed in claim 1, characterized in that the end piece has a compact form.

7. The device as claimed in claim 2, wherein said end piece and its said housing in the handle have a generally parallelepipedic form, thereby fitting together without the possibility of relative rotation therebetween about the axis of the handle, said end piece has a compact form and is located at a level lower than that of the upper edge of the body, and said notch is formed on the upper face of said end piece and runs generally alongside the portion of the lateral wall of the body of the utensil to which the end piece is joined.

8. The device as claimed in claim 1, wherein said trigger is housed in a recess in said handle and said assembly of links constituting said toggle joint comprises, as said other links, two intermediate links mounted on a first mobile pin for jointly pivoting on the rear of the first link on each side thereof, and two end links in the form of double S springs connected by one of their curved ends to the rear ends of said two intermediate links by means of a second mobile pin, these two springs being housed with play in two grooves formed at the front of each side of the trigger and being interlocked with the trigger which is mounted for pivoting against the action of said return spring about a fixed pin, which passes through the handle and the trigger and on which are also mounted the second ends of said springs, and said second mobile pin passing through the trigger, at the top of the front region thereof, through an aperture providing for this pin a vertical play of a few millimeters.

9. The device as claimed in claim 8, wherein said end piece and its said housing in the handle have a generally parallelepipedic form, thereby fitting together without the possibility of relative rotation therebetween about the axis of the handle, said end piece has a compact form and is located at a level lower than that of the upper edge of the body, and said notch is formed on the upper face of said end piece and runs generally alongside the portion of the lateral wall of the body of the utensil to which the end piece is joined.

10. The device as claimed in claim 1, wherein said end piece and its said housing in the handle have a generally parallelepipedic form, thereby fitting together without the possibility of relative rotation therebetween about the axis of the handle, said end piece has a compact form and is located at a level lower than that of the upper edge of the body, and said notch is formed on the upper face of said end piece and runs generally alongside the portion of the lateral wall of the body of the utensil to which the end piece is joined.

* * * * *